United States Patent
Shu et al.

(10) Patent No.: US 12,531,385 B2
(45) Date of Patent: Jan. 20, 2026

(54) RAMAN FIBER LASER EMPLOYING ULTRA-LOW REFLECTANCE FIBER BRAGG GRATING

(71) Applicant: Huazhong University of Science and Technology, Hubei (CN)

(72) Inventors: Xuewen Shu, Hubei (CN); Yanxin Li, Hubei (CN); Jiancheng Deng, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 748 days.

(21) Appl. No.: 17/821,352

(22) Filed: Aug. 22, 2022

(65) Prior Publication Data

US 2023/0216264 A1 Jul. 6, 2023

(30) Foreign Application Priority Data

Dec. 30, 2021 (CN) .......................... 202111647170.5

(51) Int. Cl.
*H01S 3/30* (2006.01)
*H01S 3/067* (2006.01)
(Continued)

(52) U.S. Cl.
CPC ........ *H01S 3/0675* (2013.01); *H01S 3/08022* (2013.01); *H01S 3/302* (2013.01); *H01S 3/0915* (2013.01)

(58) Field of Classification Search
None
See application file for complete search history.

(56) References Cited

U.S. PATENT DOCUMENTS 5,323,404 A * 6/1994 Grubb ................... H01S 3/0675
359/345
6,678,087 B1 * 1/2004 Masuda ............... H01S 3/06754
359/341.1

(Continued)

FOREIGN PATENT DOCUMENTS

CN 112821177 A * 5/2021
CN 113097843 A * 7/2021 ......... H01S 3/06708

(Continued)

OTHER PUBLICATIONS

RP photonics (Chromatic dispersion—normal and anomalous dispersion, https://www.rp-photonics.com/chromatic_dispersion.html; retrieved May 2025) (Year: 2025).*

*Primary Examiner* — Tod T Van Roy
(74) *Attorney, Agent, or Firm* — HSML P.C.

(57) ABSTRACT

A Raman fiber laser includes a pump light source, a reflective end mirror, a wavelength division multiplexer, a Raman gain fiber, and an output end mirror. The output end mirror is an ultra-low reflectance fiber Bragg grating. The reflective end mirror is connected to a reflective end of the wavelength division multiplexer. The pump light source is connected to an input end of the wavelength division multiplexer. One end of the Raman gain fiber is connected to a common end of the wavelength division multiplexer, and the other end of the Raman gain fiber is connected to the ultra-low reflectance fiber Bragg grating. The laser of the present invention can reduce loss of laser light at the reflective end mirror, thereby increasing laser light optical conversion efficiency and output power, and simultaneously achieving high time domain stability and extremely low coherence.

4 Claims, 3 Drawing Sheets

(51) Int. Cl.
    *H01S 3/08022*     (2023.01)
    *H01S 3/0915*     (2006.01)

(56) References Cited

U.S. PATENT DOCUMENTS

| | | | |
|---|---|---|---|
| 6,714,342 B2 * | 3/2004 | Islam | H04B 10/2916 |
| | | | 359/334 |
| 8,611,003 B2 * | 12/2013 | Ahn | H01S 3/094007 |
| | | | 359/341.1 |
| 9,379,516 B2 * | 6/2016 | Keaton | G02F 1/3532 |
| 9,627,839 B2 * | 4/2017 | Clarkson | H01S 3/1086 |
| 10,271,904 B2 * | 4/2019 | Islam | A61B 18/24 |
| 10,862,262 B2 * | 12/2020 | Kajiwara | G02B 6/26 |
| 12,142,889 B2 * | 11/2024 | Fanning | G02B 6/0208 |
| 2005/0152412 A1 * | 7/2005 | Leplingard | H01S 3/302 |
| | | | 372/3 |
| 2015/0222085 A1 * | 8/2015 | Keaton | H01S 3/0941 |
| | | | 372/3 |
| 2020/0083661 A1 * | 3/2020 | Kajiwara | G02B 6/02 |
| 2022/0094134 A1 * | 3/2022 | Fanning | H01S 3/06754 |
| 2023/0216264 A1 * | 7/2023 | Shu | H01S 3/094046 |
| | | | 372/6 |

FOREIGN PATENT DOCUMENTS

| | | | | |
|---|---|---|---|---|
| CN | 114300920 A | * | 4/2022 | H01S 3/0675 |
| CN | 117477327 A | * | 1/2024 | |

* cited by examiner

Effective reflectance of output end mirror (dB)

Pump power (W)

RAMAN FIBER LASER EMPLOYING ULTRA-LOW REFLECTANCE FIBER BRAGG GRATING

TECHNICAL FIELD

The present invention pertains to the technical field of fiber lasers and more specifically, relates to a Raman fiber laser employing an ultra-low reflectance fiber Bragg grating.

BACKGROUND ART

Fiber lasers have advantages such as good directionality, high efficiency, a compact structure, easy thermal management, good beam quality, and the like, and are therefore currently widely applied in fields such as optical fiber communication, light sensing, industrial processing, laser radars, and the like. Compared with a fiber laser doped with rare earth that can operate in only certain specific wavelength windows, a Raman fiber laser is enabled to produce laser light output in an entire transparent window of an optical fiber by changing only a pump wavelength, and further has advantages of having low spontaneous background noise, being free of photo-darkening, and the like.

Currently, implementations of Raman fiber lasers are mainly divided into two categories according to feedback types at laser light output ends:

(1) An output end mirror provides feedback by using a low-reflectance grating having a reflectance of about 10%, and is combined with a high-reflectance grating at the other end of a Raman gain fiber to form a Fabry-Perot resonant cavity structure. The advantages of such Raman fiber lasers include a small threshold, a narrow-band spectrum, and a high optical signal-to-noise ratio. However, back-transmitted laser light spreads in a laser cavity during propagation, so that back-transmitted laser light may leaks out of the band of a reflection spectrum of the high-reflectance grating. Such spectral leakage may affect operation of a pump light source, and may even damage the pump light source in a severe case. Spectral leakage also causes significant reduction in effective reflectance of the high-reflectance grating, thereby decreasing optical conversion efficiency of laser light, and hindering increase in power of such high-power Raman fiber lasers. Although a broadband high-reflectance grating can be employed to alleviate spectral leakage, it is difficult for a broadband high-reflectance grating capable of withstanding high power to achieve relatively high reflectance. In summary, ensuring that a high-reflectance grating at high power has high effective reflectance is a major difficulty faced by a high-power Raman fiber laser of this scheme. Further, high-power laser light having low relative intensity noise being achieved in such Raman fiber lasers has not been reported yet.

(2) An output end mirror provides random distributed feedback by using Rayleigh scattering. Such a high-power Raman fiber laser is commonly referred to as a fiber random Raman laser. In order to improve efficiency and directionality and reduce a threshold, such a laser typically employs a structure of a semi-open cavity. That is, one end is a long optical fiber, and the other end employs a high-reflectance grating. Such a Raman fiber laser has very good time domain stability at high power, and therefore has low relative intensity noise, due to that the random feedback provided by Rayleigh scattering can cause modes to overlap and a pump light source having low relative intensity noise is used. In addition, a spectrum of such a laser is mode-free, thus having extremely low coherence. Compared with a Raman fiber laser constructed by employing a grating having a low reflectance of about 10%, a Raman fiber laser employing Rayleigh scattering is often capable of achieving higher optical efficiency at high power. However, due to very weak Rayleigh scattering in an optical fiber and wavelength insensitivity, such a Raman fiber laser employing Rayleigh scattering has disadvantages such as a high threshold, a low optical signal-to-noise ratio, a large spectral bandwidth, and the like. In addition, such a laser near a threshold is subjected to both stimulated Brillouin scattering and Rayleigh scattering, so that the laser constructed by using this scheme is in a very unstable self-Q-switched operation state, and a very large number of unstable narrow-band peaks occur in the spectrum.

SUMMARY OF THE INVENTION

In view of the above defects in or improvement requirements on the prior art, the present invention provides a Raman fiber laser employing an ultra-low reflectance fiber Bragg grating, and an object thereof is to reduce loss of laser light at a reflective end mirror of a Raman laser.

In order to achieve the above object, the present invention provides a Raman fiber laser employing an ultra-low reflectance fiber Bragg grating, comprising: a pump light source, a reflective end mirror, a wavelength division multiplexer, a Raman gain fiber, and an output end mirror, wherein the output end mirror is an ultra-low reflectance fiber Bragg grating, the reflective end mirror is connected to a reflective end of the wavelength division multiplexer, the pump light source is connected to an input end of the wavelength division multiplexer, one end of the Raman gain fiber is connected to a common end of the wavelength division multiplexer, and the other end of the Raman gain fiber is connected to the ultra-low reflectance fiber Bragg grating.

Further, the ultra-low reflectance fiber Bragg grating has a reflectance of <1%.

Further, the pump light source is a low relative intensity noise light source having a relative intensity noise of less than −100 dB/Hz.

Further, a central wavelength of the reflective end mirror and the ultra-low reflectance fiber Bragg grating is located in an anomalous dispersion region of the Raman gain fiber.

Further, the reflective end mirror is a fiber Bragg grating having an effective reflectance of greater than 50%.

Further, an end of the ultra-low reflectance fiber Bragg grating has an obliquely cut laser light output port.

Further, the pump light source outputs a pump light power of greater than 5 W.

In general, compared with the prior art, the technical solutions contemplated by means of the present invention can achieve the following beneficial effects:

(1) In the Raman fiber laser provided by the present invention, the ultra-low reflectance fiber Bragg grating is used as the output end mirror. Compared with a Raman fiber laser employing a fiber Bragg grating having a reflectance of about 10%, in case of high pump power, reflectance of laser light forward-transmitted in a laser cavity at the output end mirror can be decreased, so that power of laser light back-transmitted in the laser cavity is decreased, thereby decreasing power of laser light incident at the reflective end mirror, ultimately decreasing loss of back-transmitted laser light at the reflective end mirror, and correspondingly improving laser light optical conversion efficiency and maximum output power of the Raman laser.

(2) Compared with the Raman fiber laser employing Rayleigh scattering, in the Raman fiber laser employing an ultra-low reflectance fiber Bragg grating of the present invention, the employed ultra-low reflectance fiber Bragg grating has wavelength selectivity, and can provide stronger feedback, thereby achieving a more narrow spectral bandwidth, a lower threshold, and higher optical conversion efficiency.

(3) Preferably, the pump light source of the present invention is a low relative intensity noise light source having a relative intensity noise of less than −100 dB/Hz, thereby preventing pump light intensity noise from being transmitted to Raman fiber laser light. In addition, the central wavelength of the reflective end mirror and the ultra-low reflectance fiber Bragg grating is located in the anomalous dispersion region of the Raman gain fiber, so that a stimulated wavelength of the laser is located in the anomalous dispersion region of the Raman gain fiber, and the laser at high power can achieve lasing without any discrete longitudinal mode, thereby achieving very low relative intensity noise, high time domain stability, and extremely low coherence.

(4) In the present invention, the ultra-low reflectance fiber Bragg grating is used as the output end mirror, thereby reducing loss of back-transmitted laser light at the reflective end mirror. Therefore, under the same conditions, using a fiber Bragg grating having a lower effective reflectance as the reflective end mirror can still enable the laser to achieve high conversion efficiency.

(5) Preferably, the ultra-low reflectance fiber Bragg grating of the present invention has the obliquely cut laser light output port, thereby eliminating parasitic feedback of the output port.

In summary, the Raman fiber laser employing an ultra-low reflectance fiber Bragg grating of the present invention can reduce loss of laser light at the reflective end mirror, thereby improving optical conversion efficiency of outputting laser light. In addition, the ultra-low reflectance fiber Bragg grating has low insertion loss, is easy to make and implement, and has superior performance. The laser of the present invention can expand applications of a Raman fiber laser in industrial processing, communication, sensing, lighting, radars, and the like.

BRIEF DESCRIPTION OF THE DRAWINGS

In all of the accompanying drawings, the same reference numerals are used to denote the same elements or structures, wherein: 11—pump light source; 12—reflective end mirror; 13—wavelength division multiplexer; 14—Raman gain fiber; 15—output end mirror; and 16—output port.

DETAILED DESCRIPTION

In order to make the object, technical solution, and advantages of the present invention clearer, the following detailed description of the present invention is made with reference to the accompanying drawings and embodiments. It is to be understood that specific embodiments described herein are used merely to explain the present invention, and are not used to limit the present invention. Further, the technical features involved in the various embodiments of the present invention described below may be combined with each other as long as there is no conflict therebetween.

Figure 1:
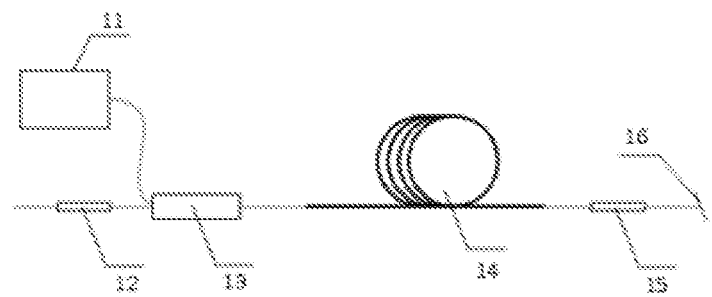
FIG. 1 is a schematic structural view of a Raman fiber laser employing an ultra-low reflectance fiber Bragg grating according to the present invention.

As shown in FIG. 1, the present invention provides a Raman fiber laser employing an ultra-low reflectance fiber Bragg grating, including: a pump light source 11, a reflective end mirror 12, a wavelength division multiplexer 13, a Raman gain fiber 14, and an output end mirror 15.

The reflective end mirror 12 is a fiber Bragg grating, and has an effective reflectance of greater than 50% at maximum pump power. The output end mirror 15 is an ultra-low reflectance grating, namely, a fiber Bragg grating having an ultra-low reflectance.

A laser connection structure of the present invention is shown in FIG. 1. An output end of the pump light source 11 is connected to an input end of the wavelength division multiplexer 13. A reflective end of the wavelength division multiplexer 13 is connected to the reflective end mirror 12. A common end of the wavelength division multiplexer 13 is connected to one end of the Raman gain fiber 14, and the other end of the Raman gain fiber 14 is connected to the output end mirror 15. An output port 16 of the laser is provided on a side of the output end mirror 15. The output port 16 is obliquely cut so as to eliminate parasitic feedback of the output port 16. The output end mirror 15 is an ultra-low reflectance fiber Bragg grating.

The pump light source 11 is used to produce pump light. The pump light is coupled into the Raman gain fiber 14 by means of the wavelength division multiplexer 13 so as to energize the same. The Raman gain fiber 14 is used to be energized to produce the stimulated Raman scattering (SRS). Due to a feedback effect of the reflective end mirror 12 and the output end mirror 15, light is amplified in the Raman gain fiber 14, thereby forming a laser output as the pump power increases. The pump light may be coupled into a laser cavity by means of a device such as a wavelength division multiplexer, a pump beam combiner, or the like, and may also be coupled directly from the reflective end mirror into the laser cavity.

Although the output end mirror 15 is an ultra-low reflectance fiber Bragg grating, it has a greater feedback effect as compared to Rayleigh scattering because the reflection of an ultra-low reflectance fiber Bragg grating is stronger than Rayleigh scattering.

Further, the pump light source is a narrow-band spontaneous radiation source having low relative intensity noise, and the relative intensity noise thereof is less than −100 dB/Hz, thereby greatly mitigating an effect of intensity noise of pump light on time domain stability of the Raman fiber laser light. In the present invention, a central wavelength of the reflective end mirror and the ultra-low reflectance fiber Bragg grating is located in an anomalous dispersion region of the Raman gain fiber, so that a lasing wavelength of the laser of the present invention is located in the anomalous dispersion region of the Raman gain fiber. A modulation instability effect in the anomalous dispersion region disrupts coherence of laser light, so that the Raman laser light is changed into a light source having extremely low coherence. The beating peaks in a radio frequency spectrum of laser light decreases gradually as laser light power increases, and finally a lasing spectrum without any discrete longitudinal mode is achieved. Therefore, the laser of the present invention is a laser without any discrete longitudinal mode. Compared with an existing multi-longitudinal-mode laser of which relative intensity noise originates from radio-frequency peaks of discrete longitudinal modes, the laser of the present invention does not have any discrete longitudinal mode, and therefore has low relative intensity noise and high time domain stability.

Working principles of the present invention are:

An existing Raman fiber laser has a severe spectrum broadening effect, and at high power, a spectral width of back-transmitted Raman laser light is greater than a reflection bandwidth of the reflective end mirror that the fiber Bragg grating acts as, thereby resulting in loss of laser light due to out-of-band leakage from a reflection peak of the reflective end mirror. In addition, laser light loss at a high-reflectance grating is exacerbated as laser light power increases. In order to reduce laser light loss at the reflective end mirror of the Raman laser, the present invention uses the ultra-low reflectance fiber Bragg grating instead of a conventional grating having low reflectance of about 10% as the output end mirror. The property of ultra-low reflectance of the ultra-low reflectance fiber Bragg grating can greatly reduce reflectance of laser light forward-transmitted in the laser cavity at the output end mirror, so that power of back-transmitted laser light in the laser cavity can be decreased, thereby decreasing power of laser light incident at the reflective end mirror, decreasing loss of back-transmitted laser light at the reflective end mirror, and correspondingly improving optical efficiency of outputting laser light.

Meanwhile, the ultra-low reflectance fiber Bragg grating is used as the output end mirror, thereby reducing power of laser light incident on the reflective end mirror, and reducing loss of back-transmitted laser light at the reflective end mirror. Therefore, under the same conditions, a reflective end mirror having lower effective reflectance can be used to achieve relatively low laser light loss. Preferably, the reflective end mirror of the present invention is a fiber Bragg grating having an effective reflectance of greater than 50%.

When the reflectance of the output end mirror is reduced, the Raman fiber laser needs to employ a longer Raman gain fiber, resulting in a certain amount of additional loss. However for the high-power Raman fiber laser, the gain fiber length is short, and the Raman gain fiber typically has a small loss coefficient, so that the additional loss caused by the additionally added fiber is very low. The pump light power in the present invention is greater than 5 W.

In summary, using the ultra-low reflectance fiber Bragg grating as the output end mirror of the fiber Raman laser enables the laser of the present invention to achieve very high optical efficiency. In addition, for the high-power Raman fiber laser in which the fiber Bragg grating having a low effective reflectance is used as the reflective end mirror, the laser can also achieve very high optical efficiency.

The stimulated wavelength of the laser light is located in the anomalous dispersion region of the Raman gain fiber. A non-linear effect specific to the anomalous dispersion region, namely the modulation instability effect, disrupts coherence of the laser light, and causes longitudinal-mode broadening, and adjacent longitudinal modes may eventually overlap when laser light power is greater than or equal to certain laser light power. In this case, the laser in the present invention does not have discrete longitudinal modes as a conventional laser, and has a spectrum as that of a spontaneous radiation light source. The beats between discrete longitudinal modes in a multi-longitudinal-mode laser cause laser light to have great relative intensity noise and low stability in time domain intensity. However, the laser of the present invention does not have discrete longitudinal modes at high power, so that no beating peak occurs in a radio frequency spectrum of laser light, and therefore the Raman fiber laser of the present invention has very low relative intensity noise, and thus has high time domain stability.

Because intensity noise of pump light of the Raman fiber laser is transmitted to laser light, in order to acquire laser light having low relative intensity noise and high time domain stability, the present invention employs the pump light source having low relative intensity noise, thereby greatly mitigating the effect of pump light source intensity noise on time domain stability of the laser of the present invention.

The technical solution of the present invention is further illustrated below by means of specific embodiments.

In this embodiment, a Raman fiber laser employing an ultra-low reflectance fiber Bragg grating, as shown in FIG. 1, includes one pump light source 11. Pump light outputted by the pump light source 11 reaches a Raman gain fiber 14 by means of a wavelength division multiplexer 13. The Raman gain fiber 14 is a common communication single-mode optical fiber. An output port of an output end mirror 15 acts as an output port 16 of the laser. The port is obliquely cut to avoid parasitic feedback. The reflective end mirror 12 and the output end mirror 15 are used to provide feedback to the laser.

Further, the pump light source 11 of the laser employs a master oscillator power amplification scheme. Seed light source is a narrow-band erbium-doped spontaneous radiation source. Power amplification is performed on the seed light by means of an erbium-doped optical fiber amplifier. Therefore, low relative intensity noise is achieved. The pump light is injected into a laser cavity after passing through the wavelength division multiplexer 13, and has a maximum injection power of 10.3 W. Considering factors such as insertion loss of the wavelength division multiplexer 13, the reflective end mirror that the fiber Bragg grating acts as in the laser of the present invention can provide an effective reflectance of about 70% and a 3 dB bandwidth of about 15 nm.

An experiment compared output power of the laser employing different Raman gain fiber lengths and an output end mirror having different reflectances. The respective Raman gain fiber lengths employed are 1.6 km, 2.1 km, 2.6 km, and 3.1 km. The respective reflectances of the output end mirror are −40 dB, −32.8 dB, −27 dB, −22.4 dB, −20.1 dB, −16.6 dB, −14 dB, and −9.9 dB. An output end mirror having a reflectance of not greater than 20 dB corresponds to an ultra-low reflectance fiber Bragg grating. Bandwidths of the gratings acting as the output end mirror are all about 1 nm.

Figure 2:
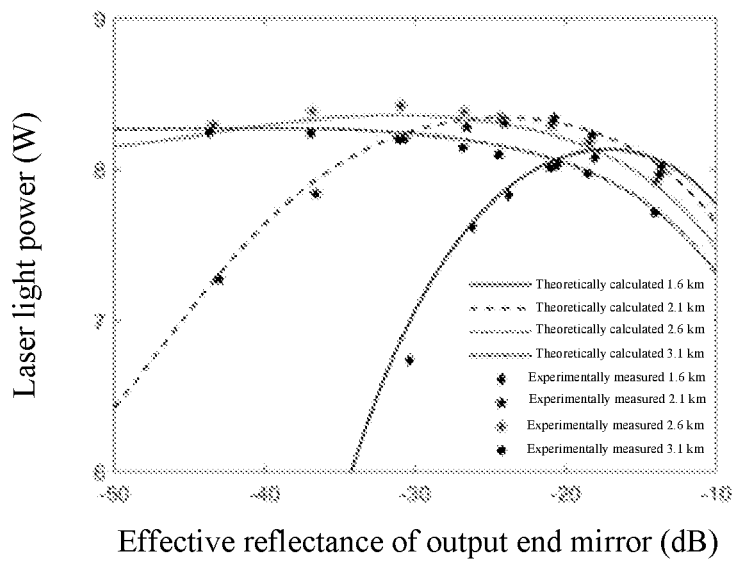
FIG. 2 shows output powers corresponding to different reflectances of the output end mirror of the Raman fiber laser according to an embodiment of the present invention.

FIG. 2 shows respective experimental results and theoretical calculation results. It can be seen that experimental measurement results of the present invention are highly consistent with theoretical simulation results. In addition, the experiment indicates that when the laser of the present invention employs a 2.6 km Raman gain fiber and an ultra-low reflectance fiber Bragg grating having a reflectance of −27 dB, maximum laser light output power can be achieved when injected pump power is 10.3 W and when the effective reflectance provided by the reflective end mirror is 70%. In this case, the effective reflectance that can be provided by the output end mirror at maximum pump power is −30.96 dB. The achieved maximum laser light output power was 8.42 W. Corresponding laser light optical conversion efficiency was up to 81.5%. Slope efficiency at maximum power was up to 91.5%. Experimental results and theoretical simulation that are compared with each other collectively indicate that compared with a case in which a conventional low-reflectance grating having a reflectance of about 10% is used as the output end mirror or feedback is provided by means of only Rayleigh scattering in the optical fiber instead of an ultra-low reflectance fiber Bragg grating, using the ultra-low reflectance fiber Bragg grating as the output end mirror can achieve higher laser light output power. In particular, in this embodiment, using the fiber Bragg grating having an ultra-low reflectance of −27 dB as the output end mirror can achieve higher laser light output power.

Calculation formulas employed in FIG. 2 are a classical power balancing model, and are as follows:

$$\frac{dP_p}{dz} = -\alpha_p P_p - g_R \frac{f_p}{f_s} P_p(P_s^- + P_s^+ + 4hf_s\Delta f) \pm \frac{dP_s^\pm}{dz} =$$

$$-\alpha_s P_s^\pm + g_R P_p(P_s^\pm + 2hf_s\Delta f) + \varepsilon P_s^\pm$$

where, $P_p$ is power of a pump light source, $P_s^\pm$ is laser light power, the positive and negative signs representing directions of propagation, $f_p$ and $f_s$ respectively represent frequencies of pump light and laser light, h is a Planck's constant, $\Delta f$ represents a bandwidth of spontaneous Raman radiation, and is taken as 10 nm, $g_R$ and $\varepsilon$ respectively represent a Raman gain coefficient of a Raman gain fiber and a Rayleigh scattering coefficient, and $\alpha_p$ and $\alpha_s$ respectively represent loss coefficients of the pump light and the laser light. Boundary conditions used during calculation are:

$P_p(0)=-P_{in}$ $P_s^+(0)=P_s^-(0)R_{eff\text{-}left}$ $P_s^-(L)=P_s^+(L)R_{eff\text{-}right}$ where $P_{in}$ is pump power injected into a laser cavity, $R_{eff\text{-}left}$ and $R_{eff\text{-}right}$ respectively represent effective reflectances of a reflective end mirror and an output end mirror, and L is a length of a Raman gain fiber. The effective reflectance of a laser cavity mirror is defined as a proportion of power of reflected laser light to power of incident laser light.

Figure 3A:
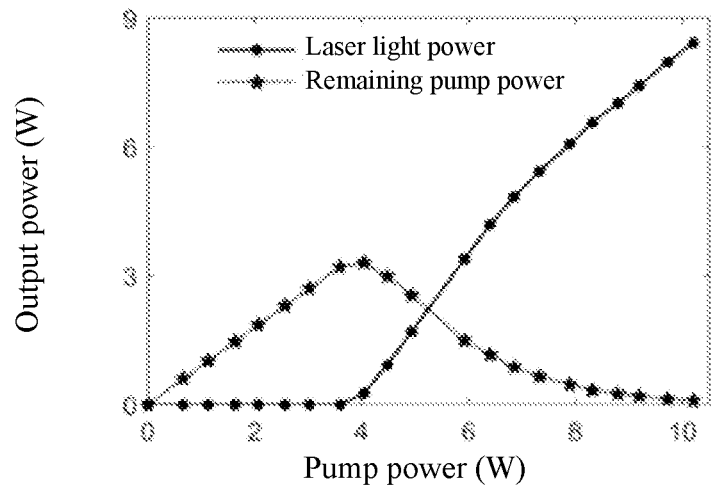
FIG. 3(a) is an evolving curve of output power with respect to pump power of the Raman fiber laser according to an embodiment of the present invention.
Figure 3B:
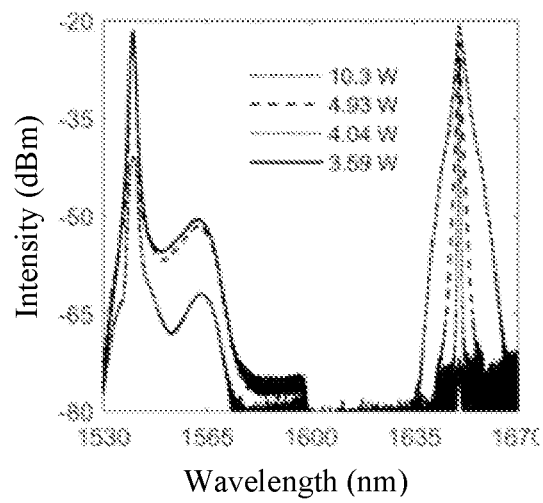
FIG. 3(b) is an output spectrum of the Raman fiber laser according to an embodiment of the present invention.
Figure 4A:
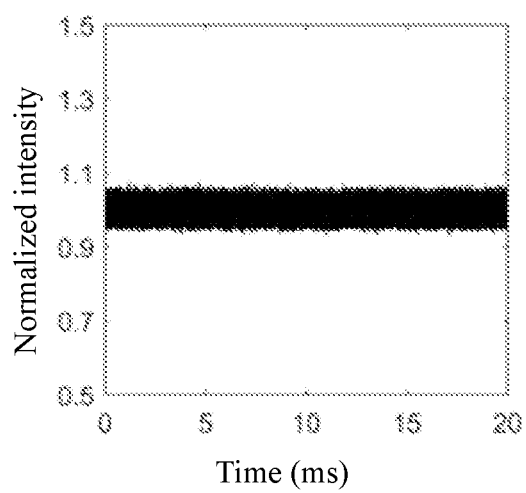
FIG. 4(a) is a time domain intensity map of the Raman fiber laser at maximum laser light power according to an embodiment of the present invention.
Figure 4B:
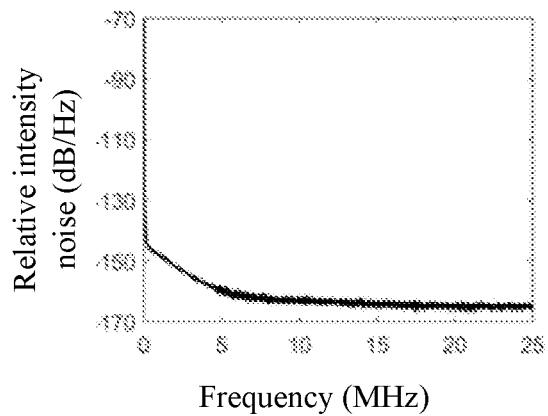
FIG. 4(b) shows relative intensity noise of the Raman fiber laser at maximum laser light power according to an embodiment of the present invention.

In this embodiment, measurement was performed under the condition in which the laser in the present invention achieves maximum output power (that is, when a Raman gain fiber length of 2.6 km and a fiber Bragg grating having an ultra-low reflectance of −27 dB are employed), and an output power curve and an output spectrum are respectively shown in FIG. 3 (a) and FIG. 3 (b), where the respective pump light powers are 3.59 W, 4.04 W, 4.93 W, and 10.3 W. A spectral bandwidth of the laser in the present invention at the maximum output power is 1.78 nm, and an optical signal-to-noise ratio of a lasing spectrum is about 57 dB. A narrow-band monomodal lasing spectrum near a threshold indicates that the ultra-low reflectance fiber Bragg grating in the laser in the present invention can inhibit stimulated Brillouin scattering. Therefore, compared with a random Raman fiber laser employing Rayleigh scattering, the laser in the present invention has higher stability near the threshold. Time domain intensity of the laser in the present invention at maximum output laser light power is measured by means of an oscilloscope having a 100 MHz bandwidth. As shown in FIG. 4(a), it can be seen that the laser in the present invention has very high time domain stability, and a standard deviation of intensity fluctuations is only 1.52%. The relative intensity noise of the laser in the present invention at the maximum output laser light power is shown in FIG. 4(b), and the laser in the present invention has very low relative intensity noise, indicating that the output laser light has high time domain stability. In a range of 5 MHz, the relative intensity noise of the laser in the present invention is quickly lowered from −143 dB/Hz to −160 dB/Hz, and the relative intensity noise at frequencies greater than or equal to 10 MHz is about −165 dB/Hz. A radio frequency spectrum of the laser light without any beating peaks also indicates that the laser of the present invention has extremely low coherence.

Figure 5:
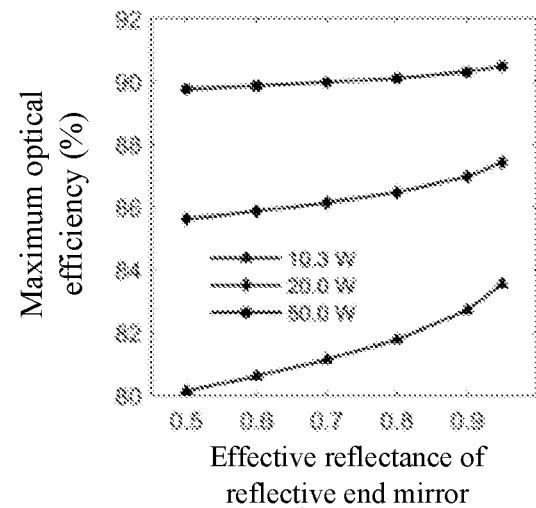
FIG. 5 is a schematic view of maximum conversion efficiency of the Raman fiber laser corresponding to different effective reflectances of a reflective end mirror at different pump powers according to an embodiment of the present invention.
Figure 6A:
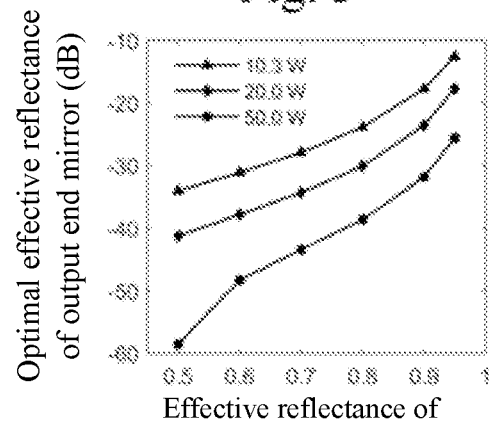
FIG. 6(a) is a schematic view of optimal effective reflectance of the output end mirror corresponding to maximum conversion efficiency achieved by the Raman fiber laser at specific pump powers according to an embodiment of the present invention.
Figure 6B:
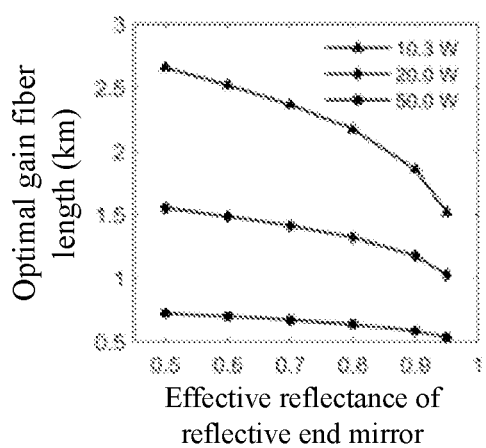
FIG. 6(b) is a schematic view of optimal gain fiber length corresponding to maximum conversion efficiency achieved by the Raman fiber laser at specific pump powers according to an embodiment of the present invention.

In this embodiment, according to the above formulas, maximum optical conversion efficiency that can be achieved by the laser using the ultra-low reflectance fiber Bragg grating as the output end mirror in the present invention at different pump powers and different effective reflectances of the reflective end mirror are further theoretically calculated. As shown in FIG. 5, the respective pump light powers are 10.3 W, 20.0 W, and 50.0 W. As can be seen in the drawing, at higher pump power, the laser in the present invention can reduce loss of pump light and laser light due to the employed shorter Raman gain fiber, thereby achieving higher optical conversion efficiency. In addition, the laser can always achieve ultra-high optical conversion efficiency of about 90% when the pump power is 50 W as long as maximum effective reflectance of the high-reflectance grating is greater than 50%. FIG. 6 (a) and FIG. 6 (b) respectively show the optimal effective reflectance of the output end mirror and the optimal Raman gain fiber length corresponding to the maximum conversion efficiency of the laser in the present invention at specific pump powers and different effective reflectances of a fiber grating serving as the reflective end mirror. As can be seen in the drawings, when the reflective end mirror in the laser of the present invention has relatively low effective reflectance, using the ultra-low reflectance fiber Bragg grating can still enable the laser to maintain relatively high laser light optical conversion efficiency. That is, the Raman fiber laser employing an ultra-low reflectance fiber Bragg grating of the present invention can further reduce the effective reflectance of the reflective end mirror.

The laser of the present invention is a Raman fiber laser having high power, high efficiency, and low relative intensity noise.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A Raman fiber laser employing an ultra-low reflectance fiber Bragg grating, comprising:
    a pump light source,
    a reflective end mirror,
    a wavelength division multiplexer,
    a Raman gain fiber, and
    an output end mirror,
    wherein the output end mirror is an ultra-low reflectance fiber Bragg grating having a reflectance of <1%,
    the reflective end mirror is connected to a reflective end of the wavelength division multiplexer,
    the pump light source is connected to an input end of the wavelength division multiplexer,
    one end of the Raman gain fiber is connected to a common end of the wavelength division multiplexer,
    the other end of the Raman gain fiber is connected to the ultra-low reflectance fiber Bragg grating,
    the pump light source is a low relative intensity noise light source having a relative intensity noise of less than −100 dB/Hz, and
    a central wavelength of the reflective end mirror and the ultra-low reflectance fiber Bragg grating is located in an anomalous dispersion region of the Raman gain fiber.

2. The Raman fiber laser according to claim 1, wherein the reflective end mirror is a fiber Bragg grating having an effective reflectance of greater than 50% and lower than 90%.

3. The Raman fiber laser according to claim 2, wherein an end of the ultra-low reflectance fiber Bragg grating has an obliquely cut laser light output port.

4. The Raman fiber laser according to claim 2, wherein the pump light source outputs a pump light power of greater than 5 W.

* * * * *